United States Patent [19]

Boerema et al.

[11] Patent Number: 4,890,883
[45] Date of Patent: Jan. 2, 1990

[54] UPHOLSTERY SYSTEM

[75] Inventors: Thomas L. Boerema, Hudsonville; Alan L. Kindig; Jeffrey D. Gras, both of Holland, all of Mich.

[73] Assignee: Prince Corporation, Holland, Mich.

[21] Appl. No.: 276,917

[22] Filed: Nov. 25, 1988

[51] Int. Cl.$^4$ ............................................... A47C 31/02
[52] U.S. Cl. ........................................ 297/227; 24/462; 160/395; 297/194; 297/218; 297/219
[58] Field of Search ............... 297/194, 218, 219, 227, 297/226, 411, 441; 24/462; 160/380, 391, 395, 398

[56] References Cited

U.S. PATENT DOCUMENTS

| | | |
|---|---|---|
| 735,540 | 8/1903 | Lyon . |
| 1,120,686 | 12/1914 | Burrowes ..................... 160/398 X |
| 1,562,105 | 11/1925 | McDonald . |
| 2,897,889 | 8/1959 | Kessler . |
| 3,302,260 | 2/1967 | Cuddeback . |
| 3,803,671 | 4/1974 | Stuppy et al. . |
| 3,960,197 | 6/1976 | Daniels . |
| 4,189,880 | 2/1980 | Ballin . |
| 4,233,790 | 11/1980 | Meadows . |
| 4,410,027 | 10/1983 | Lucous . |
| 4,549,334 | 10/1985 | Miller ........................... 160/398 X |
| 4,570,990 | 2/1986 | Flowerday . |
| 4,662,038 | 5/1987 | Walker . |
| 4,759,087 | 7/1988 | Zeilinger . |
| 4,763,946 | 8/1988 | Robbins et al. . |

FOREIGN PATENT DOCUMENTS

| | | | |
|---|---|---|---|
| 569274 | 11/1957 | Italy ...................................... 160/398 |
| 646409 | 9/1962 | Italy ...................................... 160/391 |
| 820467 | 3/1958 | United Kingdom ................. 297/218 |
| 1190183 | 4/1970 | United Kingdom ................. 297/219 |

Primary Examiner—Peter R. Brown
Attorney, Agent, or Firm—Price, Heneveld, Cooper, DeWitt & Litton

[57] ABSTRACT

An upholstery system for a vehicle accessory includes a substrate with a U-shaped channel adjacent an edge and including alternately staggered apertures and slots in its floor. A trim member with alternately staggered pins and locking tabs compressibly holds an edge of upholstery material in the channel with the pins extending through the material and into the apertures and the tabs lockably holding the trim member by fitting into the slots.

11 Claims, 3 Drawing Sheets

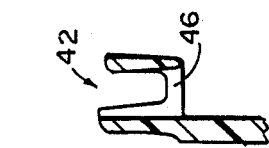
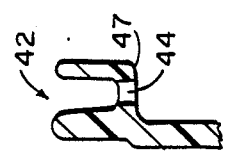
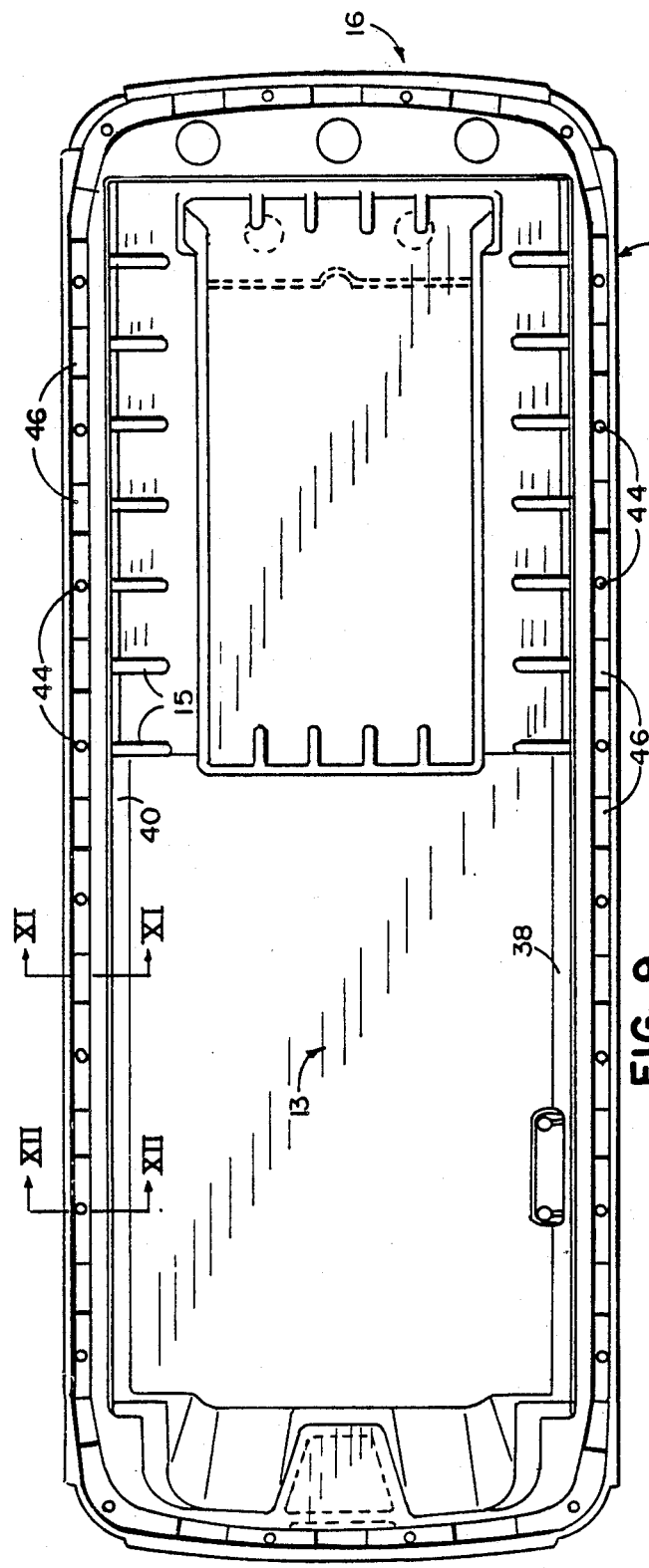
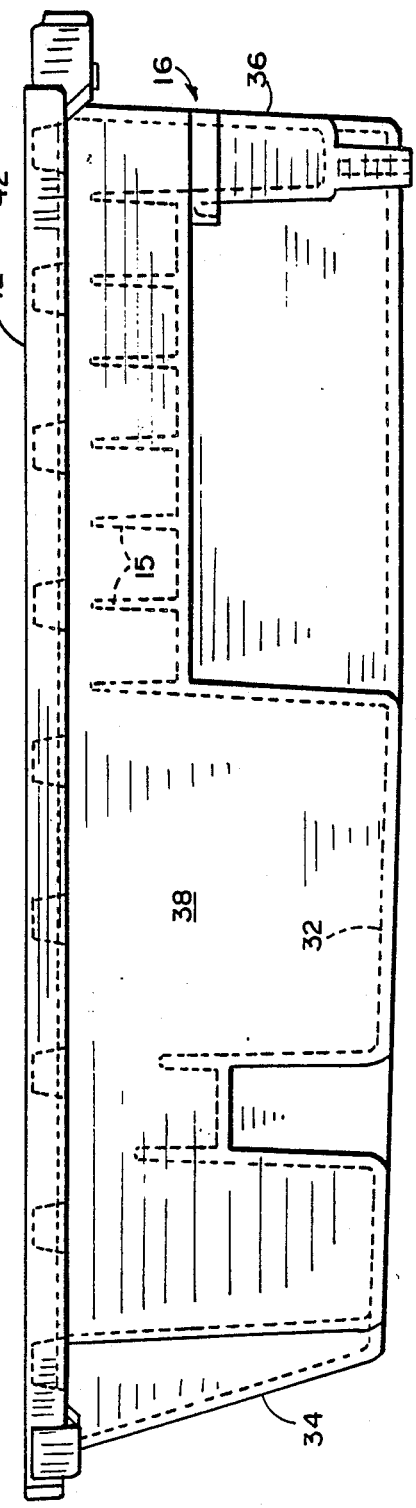

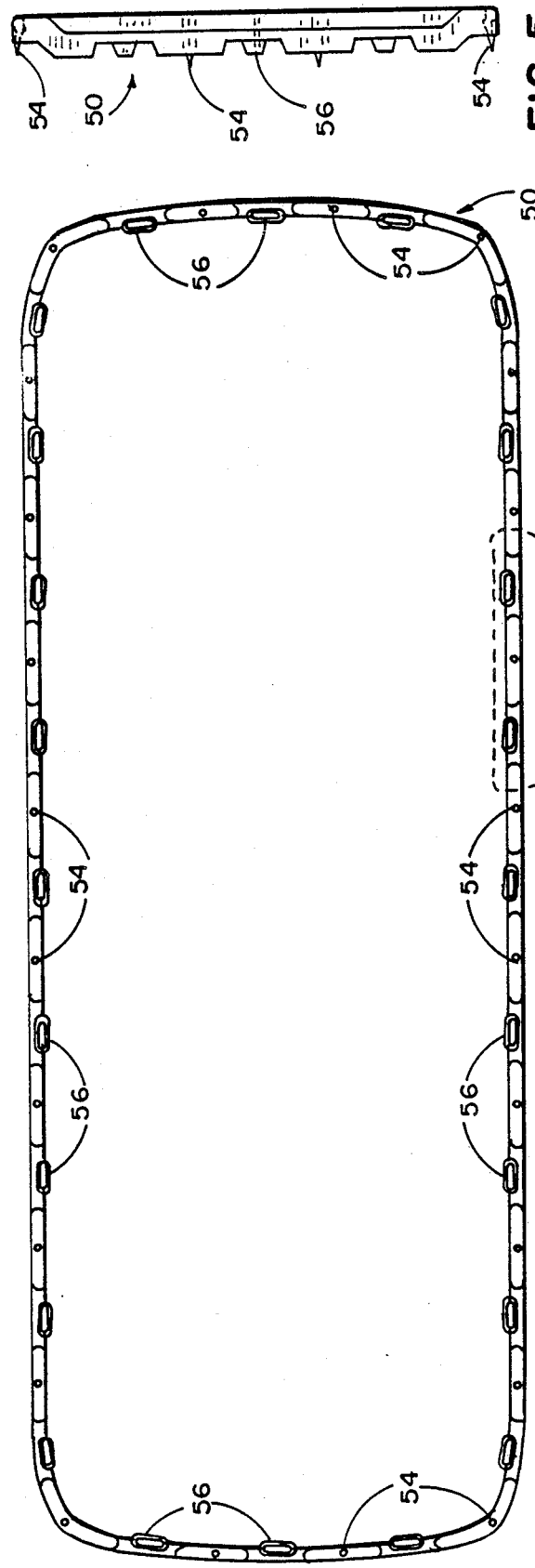

UPHOLSTERY SYSTEM

BACKGROUND OF THE INVENTION

The present invention pertains to an upholstery system and particularly to an upholstery system for use in connection with a vehicle armrest.

There exists a variety of manners in which upholstery can be trimmed out in a vehicle to provide a clean appearing end product. In the past it has been common to glue and/or staple edges of upholstery tucked around a corner of a panel so as not to expose the edge of the material. In some applications, however, such as covered armrests, when the cover is opened, the free ends of the fabric are exposed and are unsightly when simply glued or otherwise fastened to the cover. U.S. Pat. No. 4763,946 discloses a visor with an upholstery trim system in which flaps of material are compressively captured between the edges of a clam shell type visor. This general approach has also been employed for an armrest as disclosed in a continuation-in-part application of the above patent Ser. No. 184,957, filed 4/22/88 and entitled VEHICLE ARMREST.

In order to provide a finished appearance to an article such as an armrest and in particular a covered armrest therefore, it is desired to provide an upholstery system in which both a neat trim appearance is provided and one which is not expensive either in cost of labor in upholstering the product or parts employed.

SUMMARY OF THE PRESENT INVENTION

The system of the present invention accommodates these goals and provides a readily assembled system in which the substrate to be upholstered includes a groove with alternately staggered apertures and tab receiving slots formed in the floor. The groove in the preferred embodiment is a generally U-shaped channel which extends around the periphery of the substrate. A trim ring shaped in the configuration of the U-shaped channel is inserted therein and includes upholstery piercing pins alternately staggered with interlocking tabs such that upholstery can be pressed into the U-shaped groove and held in place by the locking pins while the tabs interlock the ring within the U-shaped channel.

The resultant structure provides a mechanical means by which upholstery can be trimmed around the periphery of the substrate such as parts of a vehicle armrest and mechanically held in position in a secure fashion which is readily accomplished during assembly of the These and other features, objects and advantages the present invention will become apparent upon reading he following description thereof together with reference to the accompanying drawings in which:

BRIEF DESCRIPTION OF THE DRAWINGS

FIG. 3 is a side elevational view of a trim ring incorporated in connection with the upholstery system of the present invention;

FIG. 4 is a bottom plan view of the structure shown in FIG. 3;

FIG. 5 is a right side elevational view of the structure shown FIG. 3;

FIG. 6 is an enlarged cross-sectional view taken along section lines VI—VI of FIG. 3;

FIG. 7 is an enlarged cross-sectional view taken along cross sectional lines VII—VII of FIG. 3;

FIG. 8 is an enlarged cross-sectional view taken along section lines VIII—VIII of FIG. 3;

FIG. 9 is a top plan view of the storage compartment portion of the armrest shown in FIGS. 1 and 2;

FIG. 10 is a side elevational view of the structure shown in FIG. 9;

FIG. 11 is an enlarged fragmentary cross-sectional view taken along section lines XI—XI of FIG. 9;

FIG. 12 is an nlarged fragmentary cross-sectional view taken along section lines XII—XII of FIG. 9;

FIG. 13 is an enlarged fragmentary cross-sectional view showing the combined structure of FIGS. 8 and 12 with upholstery material held in place; and FIG. 14 is an enlarged fragmentary cross-sectional view showing the combined structure of FIGS. 7 and 11 with upholstery material held in place.

DETAILED DESCRIPTION OF THE PREFERRED EMBODIMENT

Figure 2:
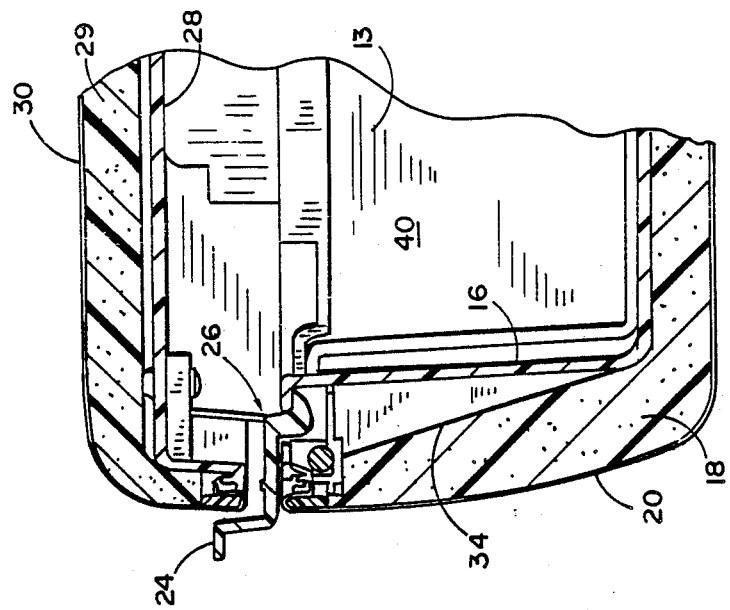
FIG. 2 is an enlarged fragmentary vertical cross section of the armrest shown in FIG. 1.
Figure 1:
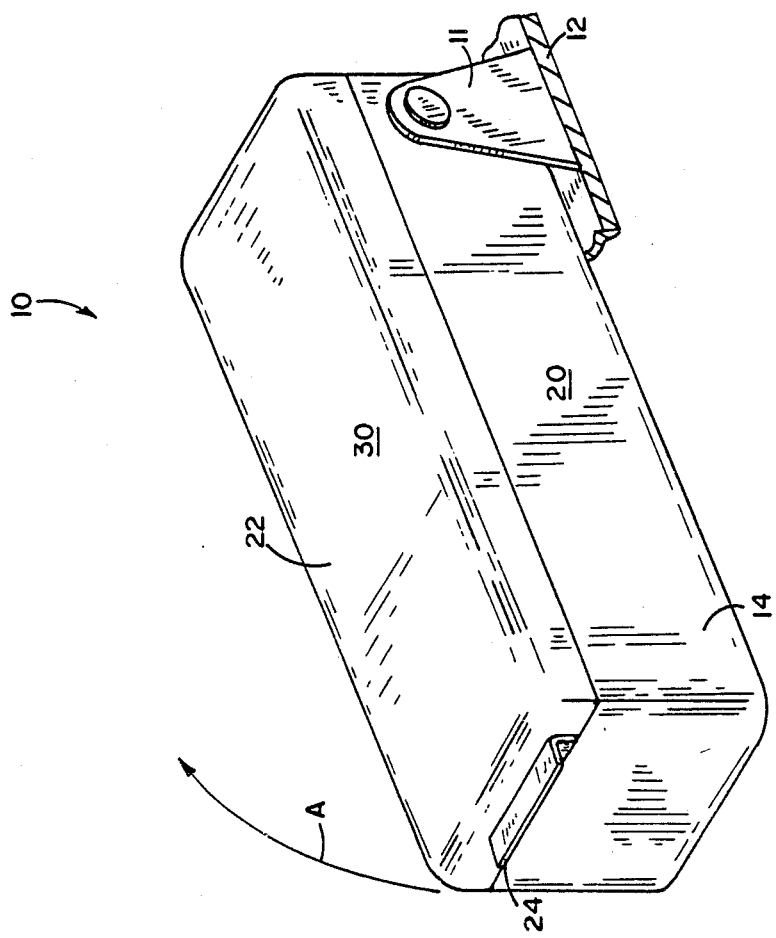
FIG. 1 is a perspective view of a vehicle armrest incorporating the present invention.

Referring initially to FIG. 1 there is shown an armrest 10 incorporating the present invention and which is mounted by a suitable mounting structure such as by a rear mounted bracket assembly 11 to a vehicle 12 represented schematically in FIG. 1. Thus, the armrest 10 may be pivoted between a lowered use position as shown in FIG. 1 between the front or rear seat backs to a raised stored position if desired. The armrest comprises in the preferred embodiment a lower housing 14 defining a storage compartment having an opening 13 as shown in FIG. 2 for receiving a variety of objects such as cassette tapes or the like as provided by the rib structure 15. As best seen in FIGS. 9 and 10, the storage compartment is defined by a liner or substrate 16 which is suitably covered by a foam padding material 18 which is upholstered by upholstery material 20 in a manner described in greater detail below.

The armrest 10 also includes a cover 22 which is conventionally hinged at its rear end to the housing 14 such that it can be pivoted to a raised open position by moving in a direction indicated by arrow A in FIG. 1 by releasing a latch handle 24 associated with latch mechanism 26 shown in detail in FIG. 2 but not forming a part of this invention. The cover 22 also includes a substrate in the form of a shallow inverted rectangular pan 28 (FIG. 2) covered by a suitable foam padding material 29 and covered by upholstery material 30 also in a manner taught below. In connection with the upholstery system employed for the bottom 14 and cover 22 of the armrest 10, substantially identical structure is employed and therefore only the lower compartment is described in detail although it is understood that the tray 28 includes a similar configuration for upholstering the cover 22.

Referring now initially to FIGS. 9-12, the lower storage tray 16 is shown which integrally includes a floor 32, a front inclined wall 34, a rear wall 36 and left and right side walls 38 and 40 respectively. Along the top peripheral edge there is provided a generally U-shaped integrally molded groove in the form of a generally U-shaped channel 42 extending around the periphery of the generally rectangular container 16 and including alternately staggered generally circular apertures 44 as best seen in FIG. 12 and slots 46 as best seen in FIG. 11. The container includes a generally open storage area 13 toward the forward portion and a ribbed section toward the rear which includes integrally molded ribs 15 to provide for tape cassette storage within the armrest. The inner sides of the U-shaped channel 42 is generally tapered inwardly as best seen in FIGS. 11 and 12 to snugly receive a trim ring 50 shown in FIGS. 3–8 with the upholstery material 20 surrounding the periphery of the bottom surface of the trim ring as best seen in FIGS. 2, 13 and 14 and as illustrated in phantom form in FIG. 4.

The trim ring 50 is a generally rectangular member which like container 16 is integrally molded and includes along its bottom edge alternately staggered sharply tapered pins 54 which are spaced to align with and fit within apertures 44 in the U-shaped channels 42 of the container 16 and locking tabs 56 which align with and fit in and lockably secure the ring within the slots 46. The trim ring 50 has a width which is slightly smaller than the U-shaped notch 42 such that the upholstery material 20 can be extended therearound as best seen in the enlarged view of FIG. 13. The tabs as best seen in FIG. 7 include a triangular tip defining a locking ledge 57 which interfits with the slot 46 as best seen in the enlarged view of FIG. 14. It is noted that the fabric 20, which is typically foamed back upholstery material is sufficiently thin to allow the tabs 56 to stretch and or pierce the material and also provide a holding force holding the upholstery in place between the pins 56 which puncture apertures through the edge of the upholstery material 20 as best seen in FIG. 13 to anchor the upholstery material. Thus, the upholstery material is cut as seen in FIG. 4 to overlie ring 50 and when the ring is fitted into place extends down into the trough 42 and partially up the outer edge of the sidewall with the pins puncturing the material. In the case of the tabs 56 the material is compressed against the inner wall of the compartment as best seen in the enlarged FIG. 14 with the locking ledge 57 extending outwardly and under the lower lip 47 of the U-shaped channel 42 as seen in FIG. 14 to lock the trim ring 50 in place.

The trim ring 50 as well as container 16 are integrally molded of a suitable polymeric material such as A.B.S. or acetol and the armrest is manufactured by molding the foam padding 18 over the outer periphery of the container 16 and subsequently overlapping the pre-cut fabric around the periphery and holding it in place in a suitable manner over the open mouth of the U-shaped channel 42 while pressing the ring 50 downwardly into position forcing pins 54 through the upholstery and thereby fixing the position of upholstery as the ring is inserted downwardly into the trough until it locks into place. The ring 50 is pushed downwardly around its periphery sufficiently such that each of the locking tabs 56 snap-lock into position as illustrated in FIG. 14 thereby mechanically holding the ring in place while at the same time securely attaching the upholstery around the periphery of the container 16. The upper surface 52 of the upholstery ring 50 is generally smooth and therefore neat in appearance as is the upper edges of the trough 42.

The cover 22 similarly includes a U-shaped channel as best seen in FIG. 2 which receives a similar upholstery ring for holding the upholstery material 30 in place around the periphery of the tray 28 defining the cover 22.

Thus, with the system of the present invention alternately staggered locking tabs and upholstery piercing pins are employed which securely attach the edge of upholstery material to a substrate providing a neat appearance and one which mechanically attaches upholstery without bonding utilizing glue, heat sealing or the like. It will become apparent that those skilled in the art that various modifications to the preferred embodiment of the invention as defined herein can be made without departing from the spirit or scope thereof as defined by the appended claims.

We claim:

1. A vehicle accessory comprising a substrate having a generally U-shaped channel formed along an edge portion and including a plurality of alternately staggered apertures and slots formed in said channel for lockably receiving a trim member therein; and a trim member including a plurality of pins and locking tabs which are alternately staggered and which align with said apertures and slots respectively of said U-shaped channel for securing upholstery material between said trim member and said U-shaped channel with said pins piercing the upholstery material and extending into said apertures and said tabs lockably securing said member within said channel.

2. The apparatus as defined in claim 1 wherein said channel extends around the periphery of said substrate and said trim member is a trim ring.

3. The apparatus as defined in claim 2 wherein said substrate comprises an armrest forming member.

4. A vehicle accessory comprising a substrate having a peripheral lip defining a generally U-shaped channel, said U-shaped channel including a plurality of alternately staggered apertures and slots for lockably receiving a trim member therein; and a trim member including a plurality of pins and locking tabs which are alternately staggered and which align with the apertures and slots respectively of said U-shaped channel for securing upholstery material between said trim member and said U-shaped channel wherein said pins pierce said upholstery material and extend into said apertures and said tabs lockably secure said member within said channel.

5. The apparatus as defined in claim 4 wherein said locking tabs are made of a resilient polymeric material and include an edge which overlies an edge of a mating slot into which the tab is inserted for locking the trim member in place within said channel.

6. The apparatus as defined in claim 5 wherein a surface of said trim member opposite said pins is a generally smooth surface.

7. The apparatus as defined in claim 6 wherein said channel extends around the periphery of said substrate and said trim member is a trim ring.

8. The apparatus as defined in claim 7 wherein said substrate comprises an armrest forming member.

9. A vehicle armrest comprising an upper and a lower section in which at least one of said sections is defined by an open tray having a peripheral lip defining a generally U-shaped channel extending around the periphery thereof, said U-shaped channel including a plurality of alternately staggered apertures and slots for lockably receiving a trim member therein; and a trim member including a plurality of pins and locking tabs which are alternately staggered and which align with the apertures and slots respectively of said U-shaped channel of said tray for securing upholster material applied to the outer surface of said tray within said U-shaped channel wherein said pins pierce said upholstery material and extend into said apertures and said tabs lockably secure said member within said channel.

11. The apparatus as defined in claim 9 wherein said locking tabs are made of a resilient polymeric material and include an edge which overlies an edge of a mating slot into which the tab is inserted for locking the trim member in place within said channel.

11. The apparatus as defined in claim 9 wherein a surface of said trim member opposite said pins is a generally smooth surface.

* * * * *

UNITED STATES PATENT AND TRADEMARK OFFICE
CERTIFICATE OF CORRECTION

PATENT NO. : 4,890,883

DATED : January 2, 1990

INVENTOR(S) : Thomas L. Boerema, Alan L. Kindig, Jeffrey D. Gras

It is certified that error appears in the above-identified patent and that said Letters Patent is hereby corrected as shown below:

Column 1, Line 50
After "of the" insert --armrest.--

Column 1, Line 51
After "advantages" insert --of--

Column 1, Line 53
"he" should be --the--

Column 2, Line 13
"nlarged" should be --enlarged--

Signed and Sealed this

Twenty-second Day of October, 1991

Attest:

HARRY F. MANBECK, JR.

Attesting Officer

Commissioner of Patents and Trademarks